United States Patent Office 3,432,737
Patented Mar. 11, 1969

3,432,737
REGULATED DIRECT CURRENT SUPPLY CIRCUIT WITH ENERGY RETURN PATH
Ian Hunter, Chelmsford, and William Patrick Fitzgerald, Great Baddow, England, assignors to The Marconi Company Limited, English Electric House, Strand, London, England
Filed Apr. 20, 1967, Ser. No. 632,258
Claims priority, application Great Britain, Apr. 22, 1966, 17,833/66
U.S. Cl. 321—2  8 Claims
Int. Cl. H02m 3/32

ABSTRACT OF THE DISCLOSURE

A circuit for producing a stabilised D.C. output voltage comprises a transformer having a divided primary and a secondary the voltage from which is rectified to provide the output voltage. The input voltage is applied between the mid point and ends of the primary through main transistor switches. The main transistor switches are closed alternately and periodically and controlled in dependence upon the D.C. output voltage for varying the portion of the period during which each main switch is open or closed. Auxiliary transistor switches are connected in shunt circuits across the halves of the primary and arranged to be open only when the main switches are closed. The auxiliary switches may be opened and closed together or closed alternately each in a different one of two successive periods of main switch operation.

---

Figure 1:
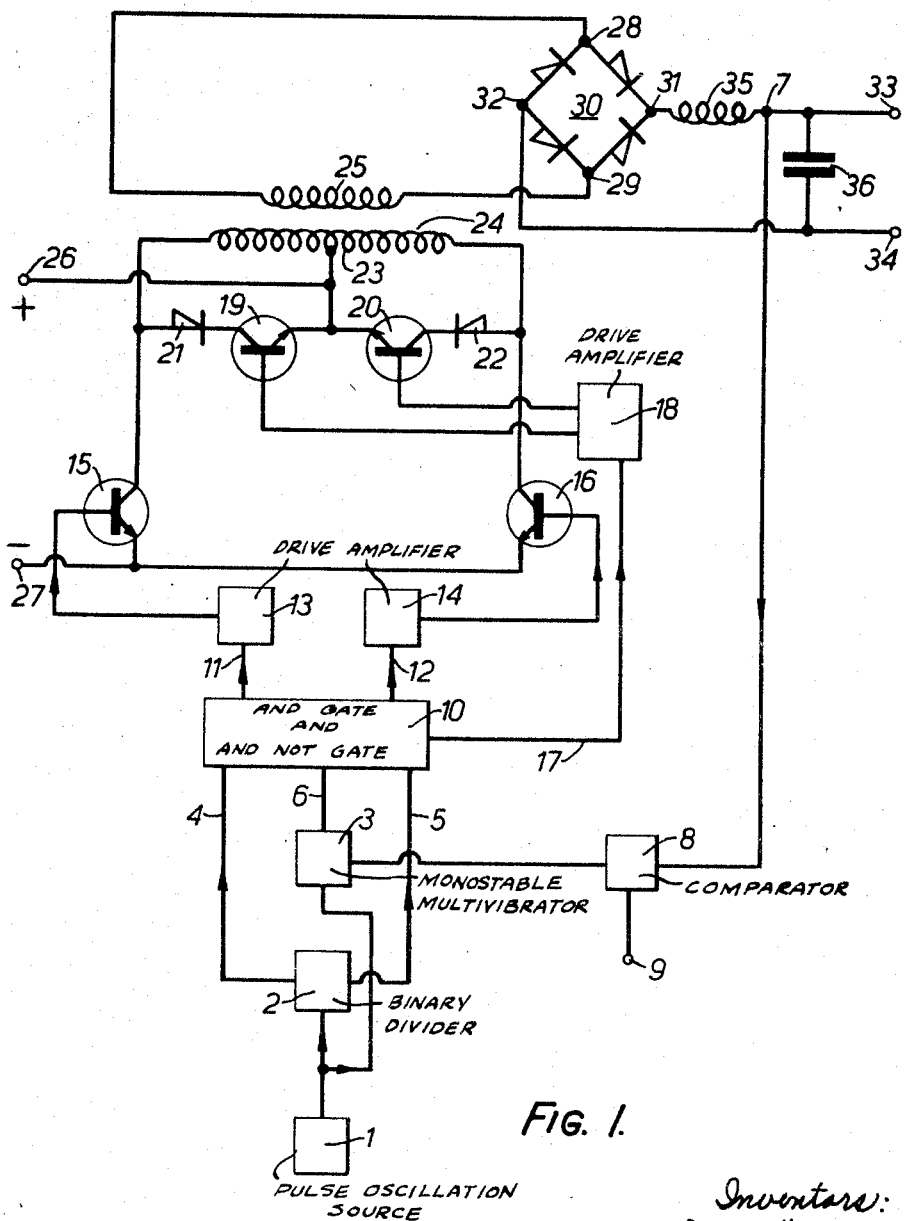

This invention relates to unidirectional current supply arrangements and more particularly to such arrangements for providing stabilised direct current supply from an unstabilised power source.

One prior D.C. supply circuit arrangement known to the present applicants obtained a stabilised D.C. output voltage from an unstabilised D.C. input voltage by means including a switched transformer circuit, the secondary voltage of the transformer being rectified to provide the output D.C. voltage. In this arrangement automatic stabilisation of the output D.C. voltage is achieved by using said voltage to control what may be termed the mark/space ratio of a pulsed switching waveform employed to switch the transformer circuit so that the proportion of the time in which said circuit is in one condition of switching is varied in dependence upon the output D.C. voltage in such manner as to produce a compensating increase in the transformer secondary voltage if said D.C. output voltage falls below a required value and a compensating decrease in the secondary voltage of the transformer if the said D.C. voltage rises above the required value at which it is to be stabilised.

This circuit arrangement, though operating well and constituting substantial improvements over previously known comparable arrangements, has certain defects and limitations, notable when high D.C. output voltages are required for such purposes as E.H.T. supply in electronic equipments. One defect is that most efficient use of the transformer is not achieved. Another is that the power loading of the transistors used for switching purposes is quite high and these transistors have to be very quick acting so that inexpensive low frequency transistors of conveniently low power capacity cannot be used. As will be seen from detailed examination of the arrangement in question, the output D.C. voltage obtainable is only about one half of the A.C. voltage available and this makes the arrangement fall short of requirements when the output D.C. voltage is required to be high. The present invention seeks to reduce or eliminate these defects and limitations.

According to this invention a circuit arrangement for producing a stabilised D.C. output voltage from an input D.C. voltage comprises a transformer having a divided primary and a secondary the voltage from which is rectified to provide the output voltage; means for applying input D.C. voltage between the mid-point of said divided primary and the ends thereof, the connections between a terminal of the input D.C. supply source and said ends including main transistor switches; means for closing said main transistor switches alternately and periodically, each switch being closed for a portion of the period and open for the remainder; means controlled in dependence upon the produced output D.C. voltage for varying the portion of the period during which each main switch is open in relation to the portion of said period during which it is closed so as to increase the former portion if the output D.C. voltage decreases below a pre-determined value and decrease said former portion if said output D.C. voltage increases above said value; auxiliary transistor switches connected in shunt circuits across the halves of the transformer primary on opposite sides of the mid-point thereof; and means for opening and closing said auxiliary switches at such times that neither is open when either main switch is open. The auxiliary switches may be opened and closed together or they may be closed alternately each in a different one of two successive periods of main switch operation.

Preferably each shunt circuit includes a diode in series with the auxiliary switch in that circuit and sensed so as to prevent the closing of said shunt circuit except during times when neither main switch is closed.

Preferably the opening and closing of the main and auxiliary switches is effected by switching wave forms derived from a common pulse wave form source.

In a preferred arrangement a common wave form source is employed to control a binary divide-by-two frequency divider and a monostable multivibrator, the divider providing two outputs in phase opposition and the multi-vibrator providing a single output of twice the frequency of the outputs from the divider, the outputs from said multi-vibrator and said divider being combined by a gate unit which includes AND and AND NOT gates and is connected to effect closing of the main switches alternately. The monostable multi-vibrator is preferably of variable mark/space ratio and the said ratio is controlled in dependence upon the D.C. output voltage by a comparator connected to compare said voltage with a reference voltage. The aforesaid gate unit is preferably also employed to combine its inputs to produce a switching wave form for controlling the opening and closing of the auxiliary switches.

Figure 2:
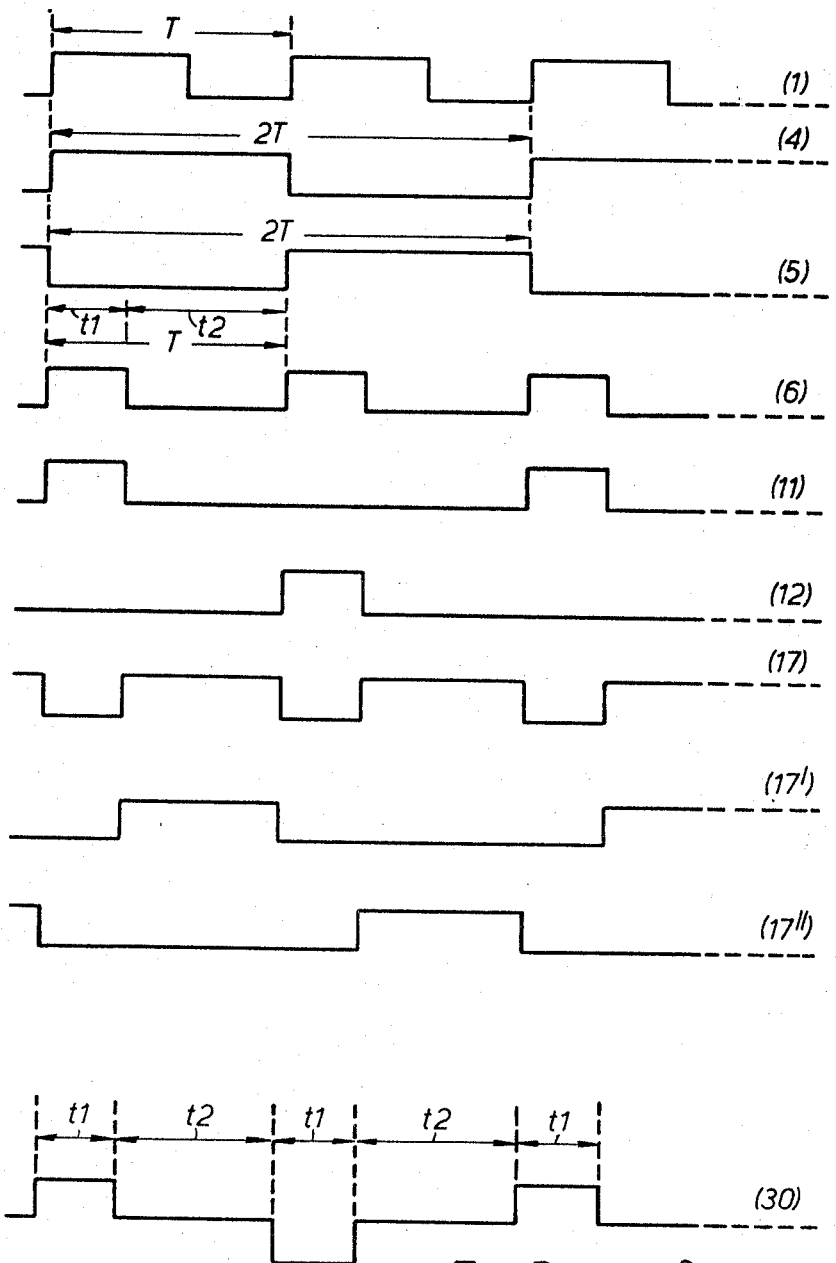

The invention is illustrated in and further explained in connection with the accompanying drawings in which FIGURE 1 is a diagram of one embodiment and FIGURE 2 is an explanatory graphical figure relating to the operation of the embodiment of FIGURE 1.

Referring to the drawings, a pulse oscillation source 1 for example a triggered or a free running oscillator, delivers periodic pulses as represented in line (1) of FIGURE 2 of a period T corresponding to a desired frequency $2_f$. The pulses from 1 are employed to trigger a binary divider 2 and a monostable multivibrator 3. The binary divider is arranged to produce two outputs in phase opposition on the output leads 4 and 5 each output having a frequency $f$ and a period $2T$ as indicated by lines (4) and (5) of FIGURE 2. The monostable multivibrator 3 provides on the output lead 6 an output of periodicity T with a mark/space ratio $R = t_1/t_2$ which is adjustable in dependence upon the D.C. voltage at a point 7 on the output lead of the whole apparatus. If the voltage at 7 increases the pulse width from 2 decreases, i.e., the ratio $t_1/t_2$ decreases while if the final output voltage decreases the pulse width is increased. Control of the pulse width from 3 is effective by a reference error amplifier or comparator 8 which compares the voltage at 7 with a reference voltage of pre-determined value fed in at 9 to the comparator 8. $t_1+t_2=T$ as shown by line (6) of FIGURE 2 which represents the output from the monostable 3.

The outputs on leads 4, 5 and 6 are combined by means of a gate unit 10 having two leads 11 and 12 and incorporating an AND gate and an AND NOT gate (not separately shown). This gate unit combines the three inputs in known manner such that when pulse signals are simultaneously present on leads 4 and 6 a signal appears on lead 11 while when pulse signals are simultaneously present on leads 5 and 6 a signal appears on lead 12. The output wave forms on leads 11 and 12 will accordingly be as represented in lines (11) and (12) respectively of FIGURE 2.

The outputs on leads 11 and 12 are fed respectively to drive amplifiers 13 and 14 which control the conductivity states of transistors 15 and 16 respectively so that 15 is rendered conductive by a signal from amplifier 13 and 16 is rendered conductive by a signal from amplifier 14. Each of these transistors will accordingly be switched, i.e., conductive for alternate times $t_1$ the two being alternately conductive.

The gate unit 10 also provides on lead 17 a wave form like that of line (6) of FIGURE 2 but in phase opposition thereto. This wave form is represented at line (17) of FIGURE 2. This wave form is fed to a drive amplifier 18 which switches on switching transistors 19 and 20 at times when neither transistor 15 nor 16 is conducting, i.e., during times $t_2$. Alternatively the gate unit 10 could be provided with two outputs and the single drive amplifier could be replaced by two drive amplifiers, each fed by a different one of the two outputs from 10 and each switching a different one of the switching transistors 19 and 20. The wave form shown in line (17) could be applied simultaneously to both drive amplifiers or preferably, a wave form as shown in line (17′) could be applied to the drive amplifier switching the transistor 19 and a wave form as shown in line (17″) could be applied to the other drive amplifier switching the transistor 20. Diodes 21 and 22, sensed as shown, are connected in series with the transistors 19 and 20 respectively the common emitter point of which is connected to the mid-point 23 of the divided primary 24 of a transformer having a secondary 25. D.C. input is applied at terminals 26, 27 between the mid-point 23 and the common emitter point of transistors 15 and 16, terminal 26 being the positive one. The operation of the diodes 21 and 22 is subsidiary to that of the transistors 19 and 20, the primary purpose being effectively to disconnect said transistors when the voltages at their collectors would otherwise be negative to their emitter voltages, i.e., when transistors 15 and 16 are "on," i.e., conductive.

The secondary 25 is connected between the ends 28, 29 of one diagonal of a rectifier bridge 30, the ends 31, 32 of the other diagonal of which supply D.C. output to output terminals 33 and 34 via a filter comprising a series inductance 35 and a shunt capacitance 36.

The switching sequence affecting the primary 24 is as follows:

(1) Transistor 15 switches "on" for a time $t_1$ and then switches off.

(2) The inductive energy stored in the transformer tends to make the collector of transistor 15 rise in potential above that of the positive terminal 26 but (3) Transistor 19 switches "on" and prevents (2) from happening. There is provided a low impedance path for the transformer magnetising current and this accordingly decays only slowly, sustaining the magnetising flux without serious diminution for a further time $t_2$.

(4) During step (3) transistor 20 is reverse biassed and effectively disconnected by diode 22.

(5) At the end of time $t_2$ transistor 16 switches "on" and transistor 19 is switched "off" so that its collector "bottoms" for a second time $t_1$.

(6) At the end of the second time $t_1$ transistor 20 switches "on" producing a step like that of (3) above.

(7) As a result of the foregoing there is produced by the secondary 25 between the bridge points 28, 29 a wave form which, as shown by line (30) of FIGURE 2, comprises equal and opposite voltage pulses each of duration $t_1$ and spaced apart by times $t_2$.

(8) It will be seen therefore that the rectified wave form from terminals 31 and 32 of the rectifier bridge is as like that shown by line (6) of FIGURE 2, i.e., that from the monostable output 6. As the "mark" time $t_1$ increases and the "space" time $t_2$ is correspondingly decreased, the potential at terminal 31 increases until, in the limit, $t_2$ becomes zero and $t_1=T$. At this limit maximum output voltage, dependent on the input voltage and proportional to the turns ratio of the transformer, is achieved and the now zero time $t_2$ manifests itself only as a transient disturbance at terminal 31.

If desired an additional AND NOT gate may be incorporated in the unit 10 and arranged to switch "on" the transistors 19 and 20 alternately each in a different one of two successive periods. The substitution of alternate actuation of transistors 19 and 20 for simultaneous actuation reduces transition disturbances and also reduces the dissipation required for the said transistors 19 and 20.

The main advantages of the invention are:

(A) There is high inherent stabilisation and no subsidiary stabilisation at low or high voltages is necessary.

(B) No inconvenient fast switching transistors or transistors of inconveniently high dissipation are necessary since transistors 15 and 16 are never "on" together.

(C) Highly efficient use is made of the transformer which can be employed over its full flux range thus enabling a smaller transformer with a smaller core to be used than would otherwise be necessary.

(D) High current switching transistors are avoided thus avoiding the need for current limiting inductors such as are commonly necessary in known D.C. supply circuit arrangements of comparable performance and also avoiding disturbing effects on D.C. mains when these are used as the input D.C. power supply.

We claim:

1. A circuit arrangement for producing a stabilised D.C. output voltage from an input D.C. voltage, said arrangement comprising a transformer having a divided primary and a secondary the voltage from which is rectified to provide the output voltage; means for applying input D.C. voltage between the mid-point of said divided primary and the ends thereof, the connections between a terminal of the input D.C. supply source and said ends including main transistor switches; means for closing said main transistor switches alternately and periodically, each switch being closed for a portion of the period and open for the remainder; means controlled in dependence upon the produced output D.C. voltage for varying the portion of the period during which each main switch is open in relation to the portion of said period during which it is closed so as to increase the former portion if the output D.C. voltage decreases below a pre-determined value and decrease said former portion if said output D.C. voltage increases above said value; auxiliary transistor switches connected in shunt circuits across the halves of the transformer primary on opposite sides of the midpoint thereof; and means for opening and closing said auxiliary switches at such times that neither is open when either main switch is open.

2. An arrangement as claimed in claim 1 wherein the auxiliary switches are arranged to be opened and closed together.

3. An arrangement as claimed in claim 1 wherein the auxiliary switches are arranged to be closed alternately each in a different one of two successive periods of main switch operation.

4. An arrangement as claimed in claim 1 wherein each shunt circuit includes a diode in series with the auxiliary switch in that circuit and sensed so as to prevent the closing of said shunt circuit except during times when neither main switch is closed.

5. An arrangement as claimed in claim 1 wherein the opening and closig of the main and auxiliary switches is effected by switching wave forms derived from a common pulse wave form source.

6. An arrangement as claimed in claim 1 wherein a common wave form source is employed to control a binary divide-by-two frequency divider and a monostable multivibrator, the divider providing two outputs in phase oposition and the multivibrator providing a single output of twice the frequency of the output from the divider, the outputs from said multivibrator and said divider being combined by a gate unit which includes AND and AND NOT gates and is connected to effect closing of the main switches alternately.

7. An arrangement as claimed in claim 6 wherein the multivibrator is of variable mark/space ratio and the said ratio is controlled in dependence upon the D.C. output voltage by a comparator connected to compare said voltage with a reference voltage.

8. An arrangement as claimed in claim 6 wherein the gate unit is also employed to combine its inputs to produce a switching wave form for controlling the opening and closing of the auxiliary switches.

References Cited

UNITED STATES PATENTS

| 2,991,410 | 7/1961 | Seike | 321—2 X |
| 3,341,765 | 9/1967 | Rogers et al. | 321—2 |
| 3,388,311 | 6/1968 | De La Lastra | 321—16 |

JOHN F. COUCH, *Primary Examiner.*

W. H. BEHA, JR., *Assistant Examiner.*

U.S. Cl. X.R.

321—16, 18, 45